United States Patent

Staten et al.

[11] Patent Number: 5,820,798
[45] Date of Patent: Oct. 13, 1998

[54] METHOD OF MAKING AN ICE RINK COVER

[75] Inventors: Kenneth E. Staten, Clare; Orley D. Rogers, Farwell, both of Mich.

[73] Assignee: Stageright Corporation, Clare, Mich.

[21] Appl. No.: 762,425

[22] Filed: Dec. 9, 1996

[51] Int. Cl.$^6$ .................... B29C 44/06; B29C 44/12
[52] U.S. Cl. .............. 264/45.5; 264/46.4; 264/46.6
[58] Field of Search ................. 264/46.4, 46.5, 264/45.5, 46.6

[56] References Cited

U.S. PATENT DOCUMENTS

| | | |
|---|---|---|
| 3,556,917 | 1/1971 | Eakin et al. |
| 3,720,027 | 3/1973 | Christensen ............... 52/309.8 |
| 3,870,587 | 3/1975 | Merrill. |
| 4,436,779 | 3/1984 | Menconi et al. |
| 4,584,221 | 4/1986 | Kung. |
| 4,632,329 | 12/1986 | Burley ................... 242/86.52 |
| 4,728,536 | 3/1988 | Burley et al. ............. 427/154 |
| 5,134,857 | 8/1992 | Burley ..................... 62/235 |

FOREIGN PATENT DOCUMENTS 54-34375  3/1979  Japan ..................... 264/46.4

*Primary Examiner*—Allan R. Kuhns
*Attorney, Agent, or Firm*—Reising, Ethington, Learman & McCulloch PLLC

[57] ABSTRACT

A load bearing, thermally insulating panel for use to cover an ice surface is made up of a plurality of modular, polymeric floor members having a structural dense body structure and a flat upper wall over which a vehicle can travel. Each floor member has an undersurface with integral, downwardly projecting, load distributing, support pillars within a floor member-surrounding, downwardly projecting marginal wall. A polymeric foam insulative layer of substantially lesser density than said floor member and substantially lesser thermal conductivity is molded within the floor member surface surrounding the pillars to fill the space around the pillars and the space between the pillars and marginal wall.

17 Claims, 5 Drawing Sheets

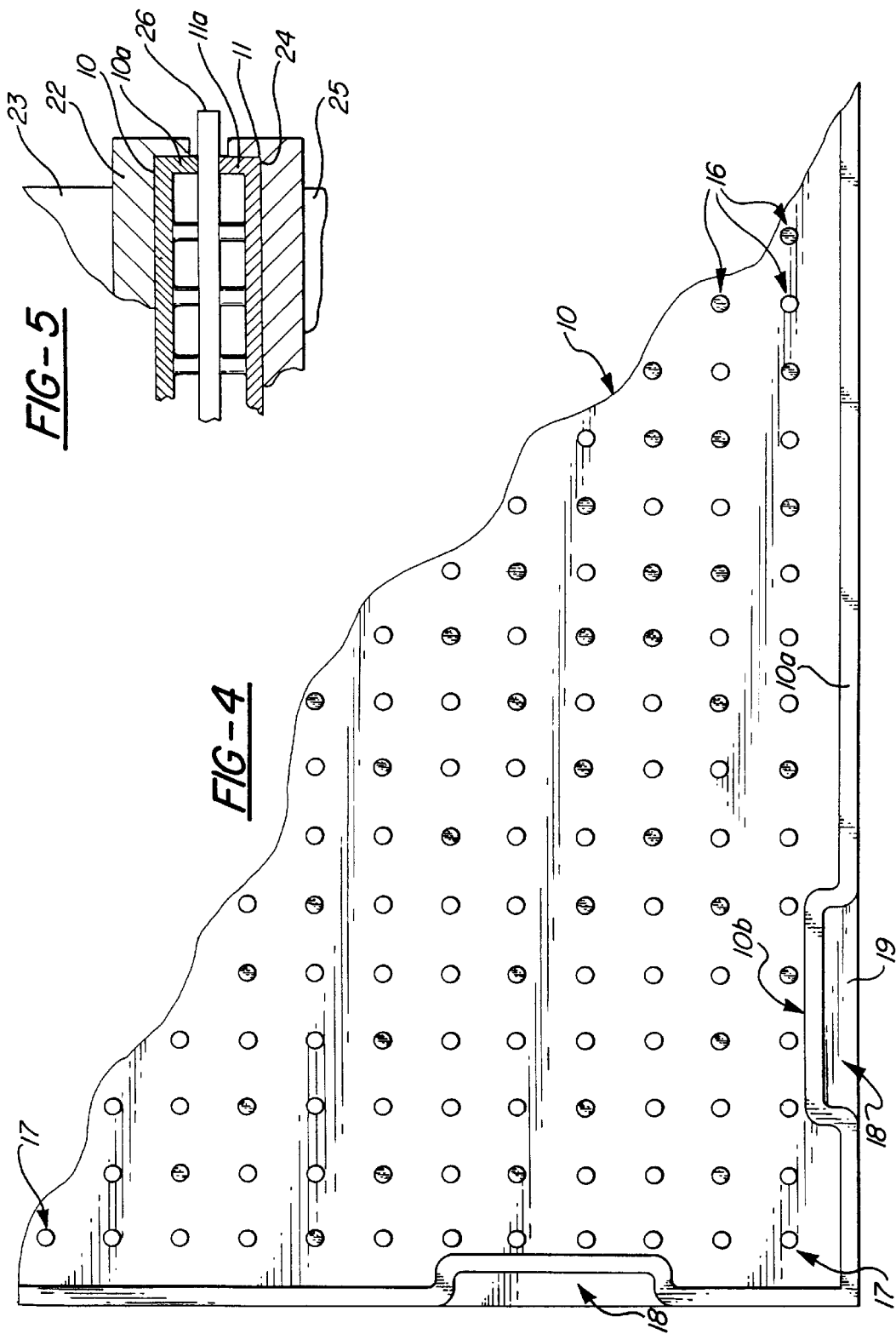

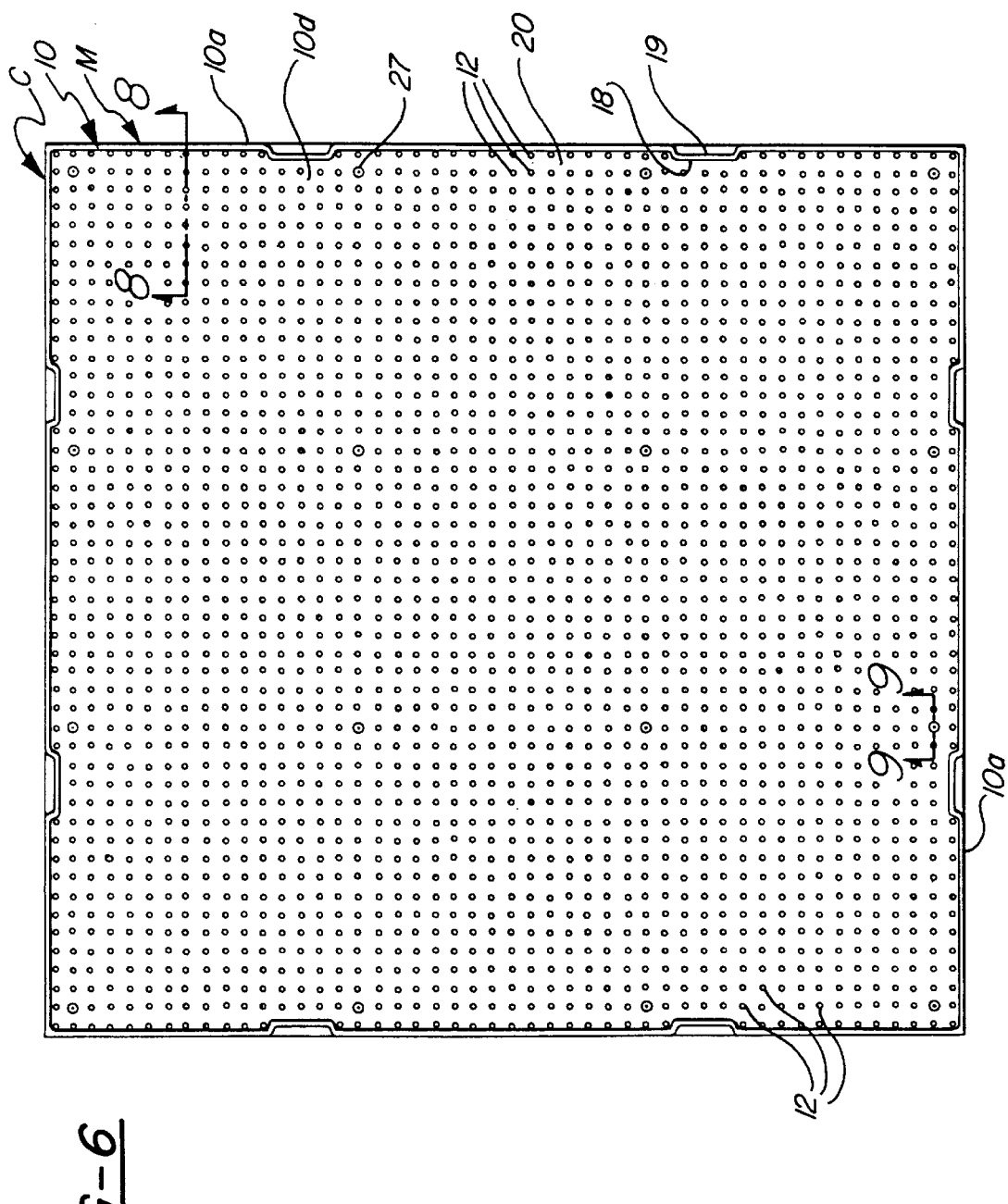

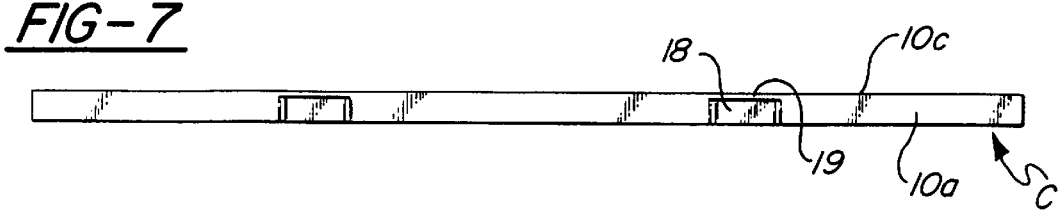
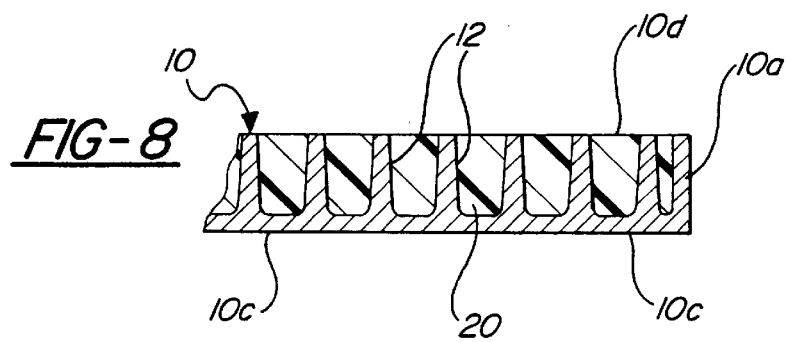
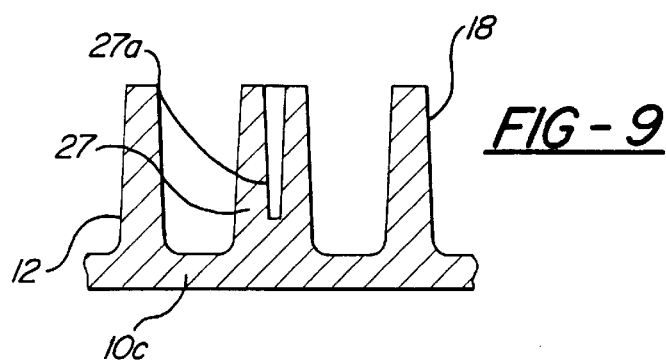
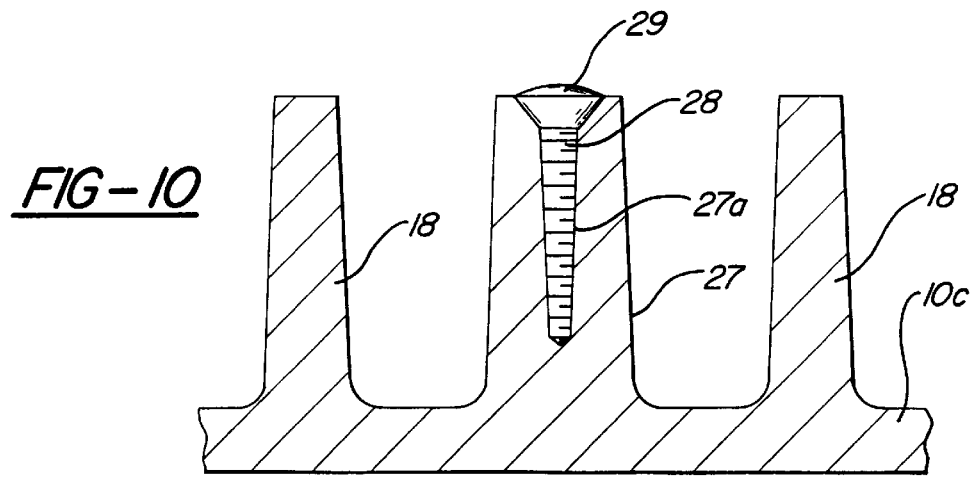

METHOD OF MAKING AN ICE RINK COVER

The present application claims the priority of provisional application Ser. No. 60/014,913, filed Apr. 5, 1996.

This invention relates to rigid cover modules which can be assembled to form a cover for ice surfaces which primarily are used in multi-purpose sports event centers for the purposes of team hockey, figure skating and open skating. Such centers are normally constructed with a refrigerant system grid of galvanized piping under a permanent concrete floor for the circulation of a continuous flow of a refrigerant of the hydrochlorofluorocarbon variety or the hydrofluorocarbon variety. Since it will be normally imperative to use the center for other non-ice surface sports and events, it is necessary that the ice be maintained with some type of thermal cover which permits the facility to stage or produce other events on top of the ice floor.

One of the cover products in use today for this purpose is a thermal blanket sold under the mark Homosote which is believed to be ground paper, pressed into sheet configuration, which is used as a packaging material and in building construction for sound insulation. When used as an ice floor cover, it is applied in 4×8 foot panels with thicknesses ranging from ½ inch to 1½ inch. It has a relatively short life span and grows in volume as it undesirably absorbs moisture. It further leaves residue on the ice surface requiring deeper scraping of the ice machine when the ice surface is again to be exposed and used. Others have used plywood, laminated board, particle board, pressboard, masonite and cardboard covers, but covers of this type, which often have been constructed by the building managers, are of limited durability, low insulative value, sweat in humid conditions, can create a storage problem, are not very crush resistent when utilizing foam as a thermal core, and are relatively expensive.

Other prior art systems include a NorCore product, which is a plastic honeycomb product with ABS skins laminated to it, sold in 4×8 foot modules. This product is considered very expensive and appears to lack thermal resistance.

Still another product is the RinkTex cover, which is a rolled product similar to carpeting, which again is very expensive and extremely labor intensive in that it requires a trained crew to install and maintain.

Still a further prior art product is known as the Cover master Cover, and comprises a series of extruded plastic strips which are hinged together so as to be able to roll up. The plastic strips have inserted foam strips for thermal value but the crush resistance, slip resistance, low R-factor, handling and storage are problems.

Finally, another product, known as Terraplas material, is produced in one meter squares about 1½" thick. This product, when used as a rink cover, appears to lack sufficient structural integrity to support rolling loads, and does not create the thermal barrier which we consider imperative.

SUMMARY OF THE INVENTION

The present invention is concerned with a cover which balances insulative value and crush and impact resistance. It is designed to support the fork lift trucks which are used to deliver and remove bundles of the modules from the ice rink, as well as to support other heavy equipment which is used for other sports and events when the cover is in place. It is normal for forklift trucks weighing 6,000 pounds and carrying a load of 3,000 pounds to drive over such covers.

The invention is concerned with rink covers which are supplied in modules and placed in abutting relationship to form an overall ice cover. Each module is constructed with at least one structural plastic floor frame which has mating load spreading support pillars arranged in a predesignated pattern and at predesignated intervals. The open area around and between the pillars, is completely filled with an insulative generally rigid foam material, to provide the necessary insulative value, while at the same time assisting in providing the requisite compressive and impact strength. The foam material occupies 85–95% of the space within the floor relative to the pillars in the embodiments disclosed.

It is a prime object of the present invention to achieve a predetermined balance between the insulative value and the crush and impact resistance of the module panel to provide a product which can successfully be utilized for the designated purpose.

Another object of the invention is to provide a product which can be readily handled, and which is cuttable so that the panels can be contoured to the perimetral contour of the ice arena where this is necessary.

Another important object of the invention is to provide a product which does not absorb moisture, does not freeze to the ice during temperature changes, and leaves no residue on the ice which would create problems during ice scraping and in use.

Still a further object of the invention is to provide an ice cover which is durable, which resists movement laterally on the ice surface, which does not sweat in humid conditions, which can be relatively economically constructed so that it can be marketed at reasonable cost, and which is readily stored.

Other objects and advantages of the invention will become apparent with reference to the accompanying drawings and the accompanying descriptive matter.

BRIEF DESCRIPTION OF THE DRAWINGS

Several embodiments of the invention are disclosed in the following description and in the accompanying drawings, wherein:

FIG. 4 is an enlarged fragmentary underside view of one of the module halves;

FIG. 5 is a schematic view illustrating steps utilized in the formation of the module;

FIG. 6 is an underplan view of the module of a modified embodiment of the invention;

FIG. 7 is an edge elevational view of the module of FIG. 6;

FIG. 8 is an enlarged, fragmentary sectional elevational view taken on the lines 8—8 of FIG. 6;

FIG. 9 is an enlarged, fragmentary sectional elevational view taken on the lines 9—9 of FIG. 6 but omitting the foam filler; and FIG. 10 is a greatly enlarged, fragmentary view similar to FIG. 9 with one of the movement resisting insert members in place.

DESCRIPTION OF ONE EMBODIMENT

Figure 1:
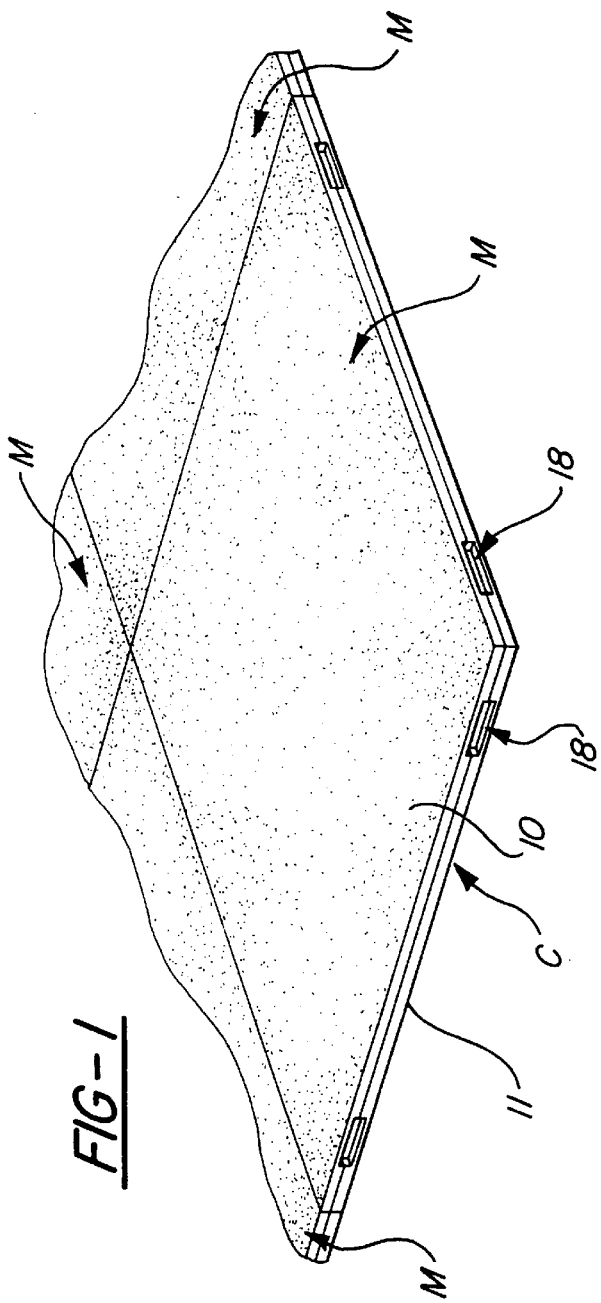
FIG. 1 is a perspective elevational fragmentary view of an ice rink cover formed by positioning the modules of the cover in abutting relationship.
Figure 3:
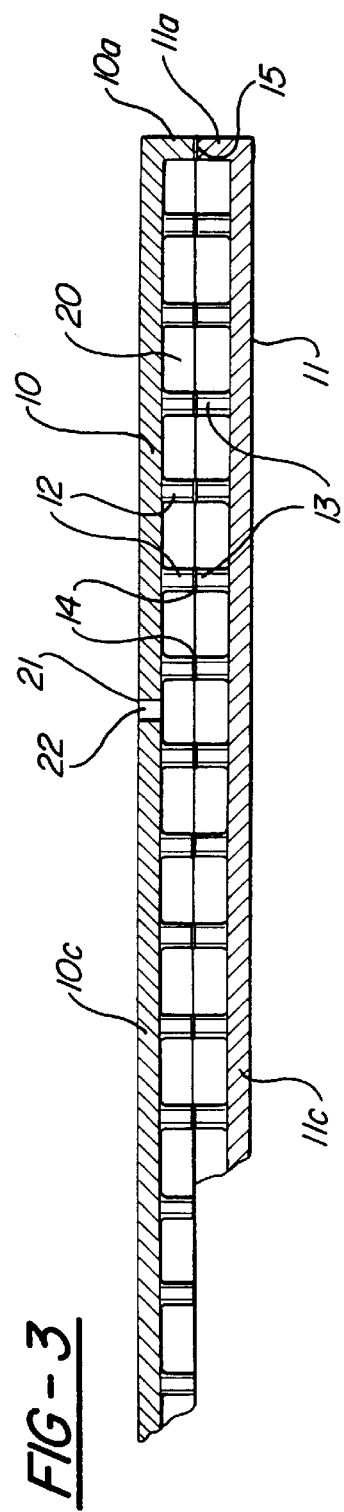
FIG. 3 is a fragmentary vertical section through one of the modules.
Figure 2:
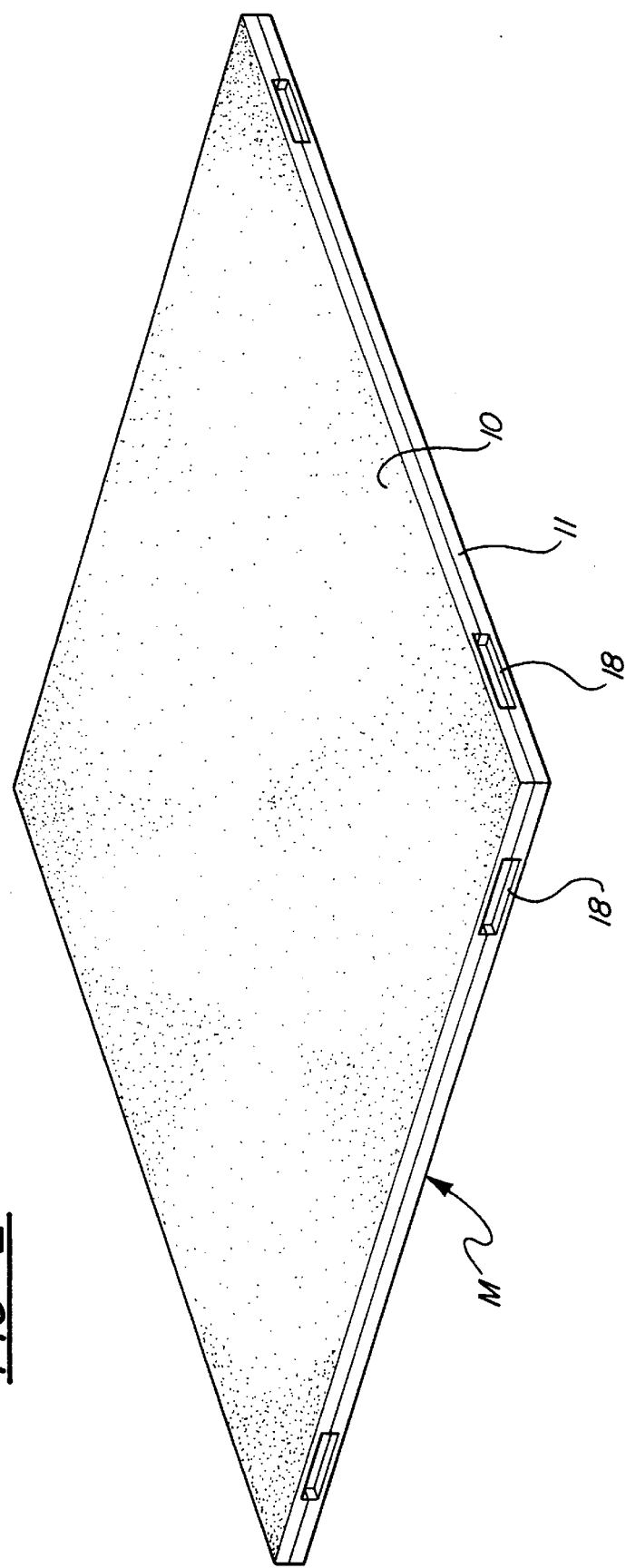
FIG. 2 is a considerably enlarged perspective elevational view of one of the panel modules only.

Referring now more particularly to FIG. 1, first of all, it will be seen that the rink cover, generally designated C, is comprised of a plurality of individual modules or panels, generally designated M, which are arranged in abutting relationship. As FIGS. 2 and 3 more particularly indicate, each module M is formed of an upper structural floor member, generally designated 10, and a lower structural floor member, generally designated 11. The polymeric floor members 10 and 11 are identical in configuration and preferably both are formed with a slip resistant outer surface, such as a pebble grain surface T, which provides traction on the outer surfaces of the panel.

As shown, each of the horizontal floor portions 10c and 11c of the panels 10 and 11 are formed with vertically extending perimetral edges 10a and 11a, respectively, and with internal vertically extending cylindrical pillars 12 and 13, respectively, which are in abutting relation throughout the panel. The panels 10 and 11 may be formed in a conventional injection mold of a strong synthetic plastic using, what is termed in the trade, a "structural foam" injection molding process. In this process, an inert gas such as nitrogen is injected with the liquid (not foam), plastic injected, or is incorporated with the plastic and released in the mold to insure filling of the mold, and the rigid molded product 10 or 11 formed has a cellular core with minute cells within an imperforate outer skin. By weight, the product 10 or 11 will be 85%–90% resin. While the polyolefins and, particularly, high density polypropylene and high density polyethylene are preferred as the structural plastic, it is thought that other plastics such as nylon or ABS and others, would be suitable, from a strength consideration.

It will be noted that the pillars 12 and 13 in the first embodiment disclosed are heat welded together at a bead 14 which is formed at their end abutting surfaces, and floors 10 and 11 are also integrated at a perimetral bead 15 formed between the edge walls 10a and 11a. The mating pillars 12 and 13 are solid, not tubular, and may be arranged at a predetermined spacing and in an overall pattern which provides the requisite compressive strength. For instance, the pillars or posts 12 and 13 are substantially ¼" in diameter and spaced center to center at 1" intervals in horizontal and transverse rows 16 and 17, as shown in FIG. 4. The floors 10c and 11c and floor edge walls 10a and 10b, and 11a and 11b, are substantially ¼" in thickness.

The floor halves 10 and 11 are molded with finger tip lifting slots, generally designated 18, formed when the vertically extending perimetrally continuous edges 10a and 11a are inset at intervals, as at 10b and 11b, inward of the corners of the module, as shown in FIG. 4, to provide a series of hand holds 18 in each side edge of the module. This insetting of portions of the abutting edges 10a and 11a leaves outwardly projecting portions 19 of the thickness of the interior floor portions 10c of the half 10, and 11c of the half 11. The interior of the abutting upper and lower side sections 10a and 11a is, however, sealed off because the portions 10b and 11b of the vertically extending edges 10a and 11a, are continuous with the edges 10a and 11a, and heat welded together in the same manner.

Provided to completely fill the remaining interior of the panel sections 10 and 11 is a substantially rigid, polymeric foam insulation 20 which may comprise a commercially available foam product which can be pressure injected as a curable foam between the panel sections 10 and 11, once they are welded together, and which has the requisite R factor. Typically, the foam insulation 20, injected as a foam and not a liquid, may be a conventional polyurethane foam product but other plastics are contemplated. Openings such as shown at 21 may be provided at appropriate places in the panel halves 10 and 11 and, after the foam insulation 20 has been injected in a flowable state under pressure through them and allowed to cure in closed cell state, sealed with solid plugs 22.

It is important that the insulation foam cells trap air or gas to provide the requisite insulative value. The insulative R value of each entire module or panel M will be at least 1.98, and preferably greater than 2.5. Applicant has achieved an R factor of 2.79 with the module described, while incorporating the necessary strength.

In FIG. 5, one method of constructing the modular panel of FIGS. 1–4 is partly schematically illustrated. As shown, the upper floor panel 10 is received in a fixture 22, carried by the platen 23 of a suitable press, while the lower panel 11 is held by a fixture 24 carried by the bed 25 of the press. Provided between the floor members 10 and 11, is a heated plate 26. The plate 26 can be mounted to move laterally into and out of position between the spread floor halves 10 and 11. When in place and the floors 10 and 11 are brought into abutting engagement with it, the plate will heat the perimetral edges 10a and 11a, and the cylindrical pillars 12 and 13, to a temperature which melts the surfaces which abut the plate 26 to the melt temperature of the plastic. When these surfaces are sufficiently plastic and tacky, the plate 26 is removed and the press members 23 and 25 are moved relatively to force the abutting surfaces of the floor halves 10 and 11 together under considerable pressure and form the beads 14 and 15. Typically, the thickness of the overall module will be reduced by 0.015 thousandths during this compression and, of course, this is taken into consideration when the panel halves 10 and 11 are molded in the first place. Each of the edges 10a and 11a and the pillars 12 and 13 will be molded slightly oversize by half of this increment to compensate.

The units 10 are believed to be considerably stronger when the edges 10a and 11a and pillars 12 and 13 are joined by heat welding than if, for example, adhesive were somehow applied, because the panels 10 and 11 will be made up solely of the same plastic without the introduction of any other materials. The resistance to crush and the impact strength characteristics are, of course, particularly significant in the mid portions of the panels. Once the floors 10 and 11 are joined, the insulating foam may be injected and allowed to cure in the manner indicated.

DESCRIPTION OF THE PREFERRED EMBODIMENT

Referring now more particularly to FIGS. 6–10 of the drawings, wherein a preferred embodiment of the invention has been specifically disclosed, the rink cover, as before, is generally designated C, and is comprised of individual modules or panels, generally designated M, which, as previously, are arranged in abutting relationship. Because the modules to be described resist displacement on the ice surface, the preferred embodiment is particularly suited to use where only a portion of an ice surface is to be covered. Whereas, previously, a pair of floor members were provided in abutting relationship, the present embodiment incorporates only the upper floor member 10, which still is formed with the slip resistant outer surface, such as a pebble grain surface, as previously, to provide traction.

The floor portion 10c of the panel 10, which is shown in inverted position in FIGS. 6–8, is formed with vertically extending perimetral edges 10a and integral, internal, vertically extending solid cylindrical pillars 12. The substantially solid, tough panel 10 is, as previously, formed in a conventional injection mold of a strong synthetic plastic of the character earlier described, injected as a non-expanded liquid, and the pillars 12 are solid and rigid, not tubular, and are arranged with a pre-determined spacing, and in an overall pattern, which provide the requisite load distribution and compressive strength. The floor thickness 10c typically will be ¼" and the pillars 12 and edge walls 10a will be 1½". The pillars 12, at their juncture with the floor 10c, have a diameter of typically 1/4" and at their upper ends have a diameter typically of 0.234". The side wall 10a typically will have a thickness of ¼". The pillars 12, further, typically merge with the floor 10c along fillets which have a radius of 0.12". Typically, the pillars 12 will be spaced apart a distance of one inch, center to center in FIG. 8.

As previously, the floor 10 is molded with the finger tip lifting slot 18 which is constructed in the same manner as previously described, and has projecting grasping portions 19.

Provided to completely fill the interior of the self supporting, load bearing structural plastic panel section 10, which remains unoccupied, is a foam insulation barrier 20 which cures as a closed cell, substantially rigid foam. This commercially available foam product is available from BASF Corporation under its designation Elastopor 12500-R and from others. Particularly the foam insulation may be a conventional polyurethane foam product which is injected as a foam in an expanded flowable state under pressure and allowed to cure to substantial inelastic rigidity. The polyurethane foam will have a density of two to three pounds per cubic foot in order to provide the requisite strength and R factor. It will consist of closed cells which have trapped air to enhance the insulative value of this foam core and will have a smooth, non-porous, outer surface or skin 10d. In view of this, the module M will not pick up moisture and will not tend to freeze to the ice surface which it engages.

FIGS. 6 and 9 indicate the placement and construction of pillars of greater girth 27 which in certain locations as shown in FIG. 6 substitute for the pillars 12 and are provided with screw sockets 27a for the reception of oval head, stainless steel screws 28. The screws 28 bite into the plastic material of the marginal walls of the openings or sockets 27a when they are threaded into a flush position on pillars 27. However, the oval heads 29 protrude as indicated in FIG. 10 to restrain sliding of the panel M on the ice during installation, and when not fully contained by a hockey dasher or rink side wall.

In this embodiment, the overall panel M thickness has been increased to 1½" and the thermal efficiency has been improved to reach an overall R factor of 3.81 or greater. In this calculation, which applies to the panel M as an entire entity, the foam 20 itself has an R factor of about 5, and is in the range 3 to 6 or greater. The molded structural floor 10, preferably formed of a high molecular weight, high density polyethylene plastic with a lesser R factor of about 2.75 or greater works in combination with the foam core as a moisture barrier to provide the thermal efficiency required of this product. It will be of an almost completely rigid nature, as will the foam 20, but the overall cover panels, while inelastic, will have sufficient flexibility to adapt to ice surface unevenness when necessary. They, also, have a thermal insulative capacity considerably greater than a metal top surface of comparable thickness, for example.

The modified polymeric modular panel is constructed somewhat differently than the double floor panel. In this method of manufacture, the floor 10, which may be referred to as a "structural foam" molded product, is placed in a fixture in inverted position and a metal platen, having its interior face covered with a release paper or agent, closes the open upper side of the floor panel 10. The foam core is sprayed in to completely fill the interior of floor 10 and occupy 85% of the space surrounded by the marginal edge, as previously, while the metal platen is being lowered into place, so it is not necessary to employ injection ports in the floor 10. The polymeric foam cures in a generally rigid closed cell condition with a smooth skin 10d in the range of 10" to 20 mils" in thickness on its exterior side which is flush with the free end surfaces of pillars 12 and 27. Upon curing, it self adheres to the floor 10 wherever it contacts floor 10. It is thought that the alternative materials for the floor and core mentioned in connection with the first embodiment enclosed might well be alternatively employed.

With the balance provided, of compressive strength and thermal barrier efficiency, fork truck traffic loads and castered equipment loads of 500 pounds on 2" wide wheels, or 2,000 pounds on a four wheel cart, are readily handled by the cover.

The disclosed embodiment is representative of a presently preferred form of the invention, but is intended to be illustrative rather than definitive thereof. The invention is defined in the claims.

We claim:

1. A method of constructing a drive-over cover member for ice surfaces used for recreational and athletic purposes and the like comprising:

a) molding a modular structural floor member having a dense body structure and having a top flat wall over which a vehicle can travel, the floor member flat wall having an under surface with integrated, downwardly projecting load distributing support pillars and having a floor member surrounding, downwardly projecting marginal wall flange within which said pillars are disposed, the floor member being molded with space around said pillars and space between said pillars and marginal wall flange to provide unoccupied space within said marginal wall flange; and b) providing in a flowable state a gas trapping, polymeric foam insulative layer of substantially lesser density but substantially greater thermal insulative capacity than said floor member within said floor member marginal wall flange to substantially fill the said unoccupied space within the marginal wall flange; and c) preventing said foam layer from extending below said pillars and marginal wall flange.

2. The method of claim 1 wherein said foam is injected within said floor member wall flange to the extent that by volume the foam occupies at least about 85% of the volumetric space surrounded by said marginal flange.

3. A method of constructing a drive-over cover for ice surfaces used for recreational and athletic purposes and the like comprising:

a) molding a modular structural floor member having a dense body structure and having a wall over which a vehicle can travel, the floor member flat wall having an under surface with integrated, downwardly projecting load distributing support pillars and a floor member surrounding, downwardly projecting marginal wall flange within which said pillars are disposed, the floor member being molded with space around said pillars and space between said pillars and marginal wall flange to provide unoccupied space within said marginal wall flange; and b) injecting a gas trapping, polymeric foam insulative layer of substantially lesser density but substantially greater thermal insulative capacity than said floor member within said floor member marginal wall flange to substantially fill the said unoccupied space within the marginal wall flange, said foam being a substantially rigid foam having a density greater than about two pounds per cubic foot with an R value of about or greater than 5, and the foam layer having a smooth unbroken non-porous bottom skin and occupying at least about 85% or more of the volumetric space surrounded by said marginal flange of the floor member while said pillars occupy about 15% or less.

4. A method of constructing a drive-over cover for ice surfaces used for recreational and athletic purposes and the like comprising:

a) providing a modular structural floor member having a dense body structure and having a top flat wall over which a vehicle can travel, the floor member flat wall having an undersurface with integrated, downwardly projecting load distributing support pillars and a perimetral downwardly projecting marginal wall flange within which said pillars are disposed, the floor member being molded with unoccupied volumetric space within said marginal flange around said pillars and between said pillars and marginal wall flange;

b) supplying in a flowable state a gas trapping, polymeric foam layer within said marginal wall flange to occupy the said unoccupied space without extending below said marginal wall flange; and c) curing the foam layer to provide an insulative layer, of substantially lesser density but substantially greater thermal insulative capacity than said floor member, which occupies said unoccupied space.

5. The method of claim 4 wherein said foam is a substantially rigid foam and the foam layer occupies at least about 85% or more of the volumetric space within said marginal flange of the floor member while said pillars occupy about 15% or less.

6. The method of claim 4 wherein said cured foam is a substantially rigid foam having a density greater than about two pounds per cubic foot with an R value of about or greater than 5 and wherein the foam layer occupies at least about 85% or more of the volumetric space surrounded by said marginal flange of the floor member while said pillars occupy about 15% or less.

7. The method of claim 4 wherein said floor member is molded of high density polyethylene having an R factor of at least about 2.75.

8. The method of claim 4 wherein said cured foam layer has an R factor in the range of at least about 3 to 6.

9. The method of claim 8 wherein the cured foam has an R factor of at least about 5.

10. The method of claim 8 wherein said floor member and cured foam together provide an overall R factor greater than 3.

11. The method of claim 4 wherein said floor member is molded of a high density synthetic plastic and said insulative foam layer is formed in the floor member of a polymeric foam which cures as a self-adhering, substantially rigid, closed cell foam, and a smooth unbroken non-porous bottom skin is formed on said foam extending flush with the bottoms of said pillars and marginal wall.

12. The method of claim 11 wherein said floor member is molded of minutely cellular polyethylene.

13. The method of claim 11 wherein said polymeric foam layer is polyurethane.

14. The method of claim 9 including affixing to certain widely spaced pillars protrusions which protrude downwardly to resist panel slippage on the ice.

15. The method of claim 14 including providing certain widely spaced pillars with screw openings and affixing screws with screw heads which protrude downwardly below said lower surfaces of the pillars and marginal wall in said openings.

16. The method of claim 4 wherein said floor member is molded with its marginal wall flange having laterally inset portions at spaced intervals to provide hand hold surface portions.

17. The method of claim 4 wherein a plurality of said pillars at their lower ends are about a quarter inch in diameter, and are spaced generally about an inch center to center.

\* \* \* \* \*

UNITED STATES PATENT AND TRADEMARK OFFICE
CERTIFICATE OF CORRECTION

PATENT NO. : 5,820,798
DATED : October 13, 1998
INVENTOR(S) : Kenneth E. Staten
Orley D. Rogers It is certified that error appears in the above-indentified patent and that said Letters Patent is hereby corrected as shown below:

Column 4, line 51, after "in" insert -- vertically --.

Signed and Sealed this

Second Day of February, 1999

Attest:

Attesting Officer

*Acting Commissioner of Patents and Trademarks*